(12) United States Patent
Marsden

(10) Patent No.: US 6,605,212 B2
(45) Date of Patent: Aug. 12, 2003

(54) REMOVAL OF POLLUTION FROM AQUEOUS BODIES

(76) Inventor: Alan Marsden, 502 NE. 21st Dr., Wilton Manor, FL (US) 33305

( * ) Notice: Subject to any disclaimer, the term of this patent is extended or adjusted under 35 U.S.C. 154(b) by 0 days.

(21) Appl. No.: 09/847,020

(22) Filed: May 1, 2001

(65) Prior Publication Data
US 2001/0020598 A1 Sep. 13, 2001

Related U.S. Application Data

(62) Division of application No. 09/174,652, filed on Oct. 19, 1998, now Pat. No. 6,264,837.

(51) Int. Cl.[7] .................................................. C02F 1/46
(52) U.S. Cl. ....................... 210/169; 210/198.1; 204/248
(58) Field of Search .......................... 204/248; 210/169, 210/198.1

(56) References Cited

U.S. PATENT DOCUMENTS

| | | | | |
|---|---|---|---|---|
| 3,873,434 A | * | 3/1975 | King | 204/248 |
| 4,224,126 A | * | 9/1980 | Bidwell | 204/196.19 |
| 4,325,798 A | * | 4/1982 | Mack | 204/248 |
| 5,094,739 A | * | 3/1992 | Kump | 204/248 |
| 5,438,642 A | * | 8/1995 | Posen | 392/485 |

* cited by examiner

Primary Examiner—Ivars Cintins
(74) Attorney, Agent, or Firm—Lerner & Greenberg, P.A.

(57) ABSTRACT

A method and device for removing pollution from polluted water, consisting of a rod on which are mounted an array of spaced magnesium plates and an array of spaced copper plates. The copper plates are in contact with the magnesium plates. Polluted water passing through the plates results in precipitates of the pollutants which can be mechanically removed.

1 Claim, 5 Drawing Sheets

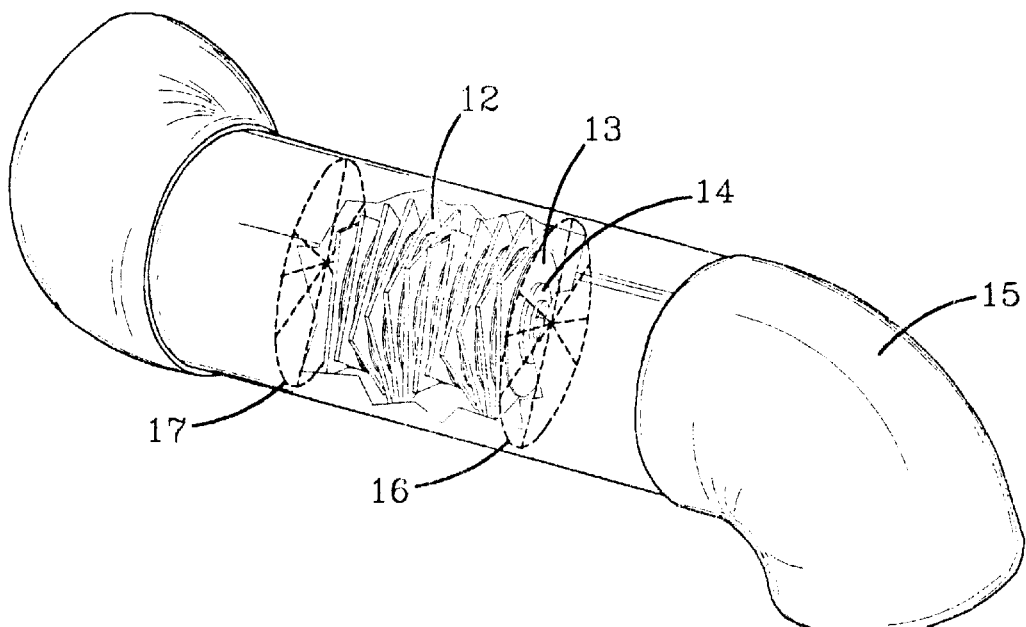
FIG 3
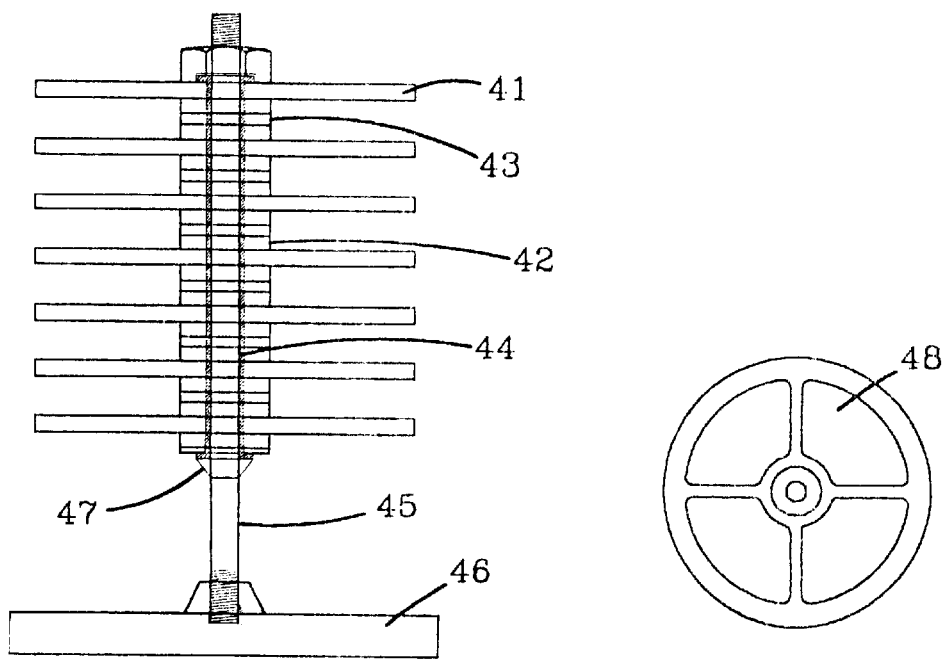
FIG 4
FIG 4a

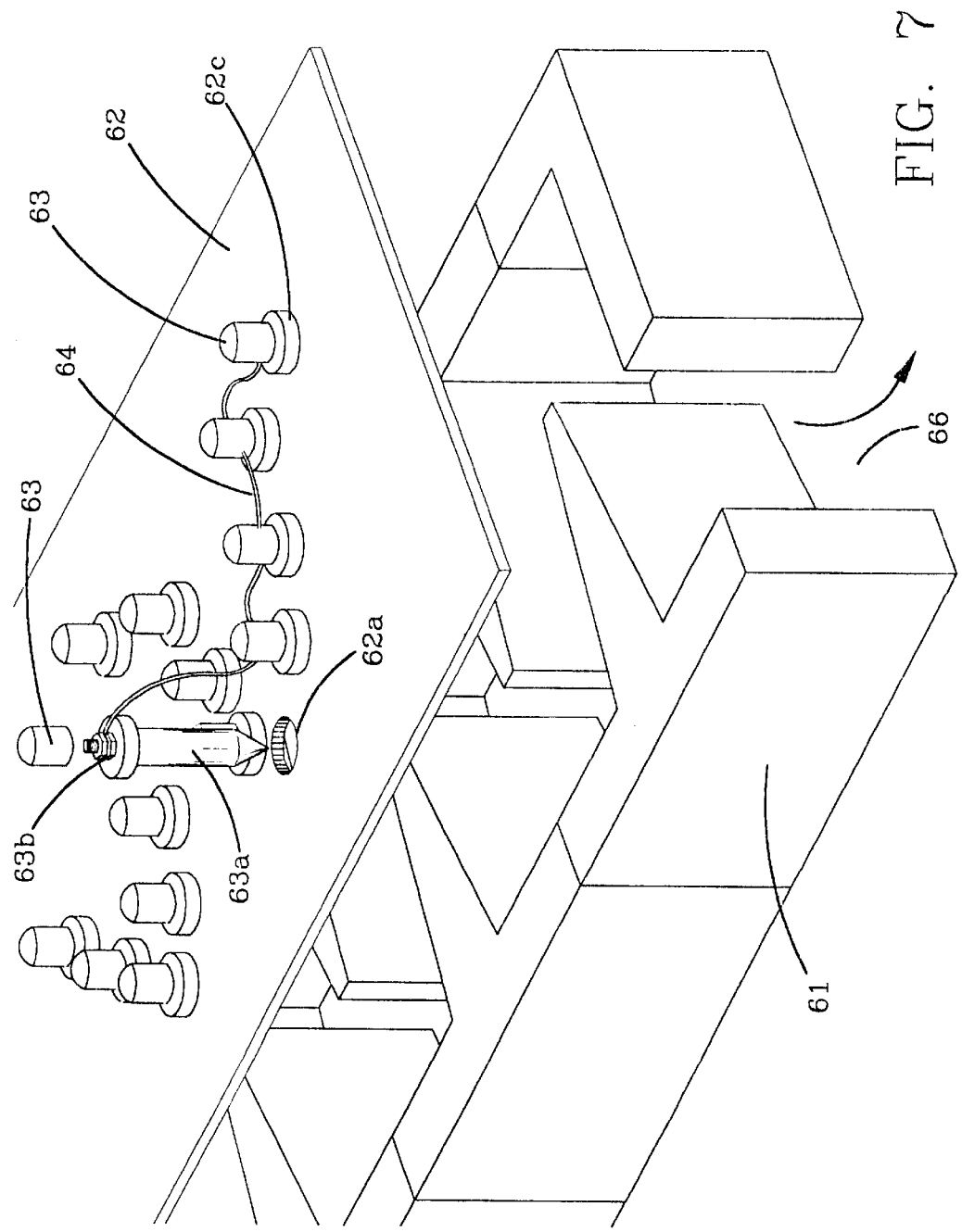

REMOVAL OF POLLUTION FROM AQUEOUS BODIES

This is a division of application Ser. No. 09/174,652, filed Oct. 19, 1998, now U.S. Pat. No. 6,264,837.

BACKGROUND OF INVENTION

This invention relates to the removal of pollution from bodies of water, particularly flowing water such as effluents in pipes. It also relates to maintaining the purity of fixed bodies of water such as fish tanks.

Many manufacturing processes utilize water which result in a polluted effluent. As an example, in the process for cane sugar refining, an unacceptable level of phosphates is found in the effluent. In a fish tank wastes result in too high acidity for the fish. Iron in well water can leave ugly rust stains.

One object of the present invention is to provide methods and devices for safely and economically removing pollutants from water. Other objects and advantages of this invention will be apparent from the specification and claims which follow, taken together with the appended drawings.

SUMMARY OF INVENTION

This invention comprises generally methods and devices for removing pollution by having the water contact a suitable amount of surface of magnesium coupled with copper. As used herein the term "copper" includes copper alloys, and the term "magnesium" includes magnesium alloys. The invention is broadly applicable to large aqueous bodies such as polluted streams as well as smaller aqueous bodies such as wells and fish tanks.

In one form of the invention a plurality of pollution-removal units are spaced along a rod, each unit comprising a magnesium plate coupled to a copper plate. As water contacts the units, the magnesium reacts so as to precipitate bodies such as insoluble salts of phosphates or ions which can then be mechanically removed by filtration. The magnesium plates can have notches, cuts, or fins to increase contact time. The number, size, and placement of the plates on the rod vary with the amount of pollution, and water flow.

In another form of this invention, a passageway for a large flowing stream has a cover from which the rod and the pollution removal units are suspended into the water.

In a fish tank several biological processes create pollution. The fish themselves consume oxygen and excrete carbon dioxide and ammonia. Also, the air itself may contain sulfur or nitrogen oxides ("acid-rain"). In the case of a fish tank or aquarium the pollution removal unit would be preferably in a cartridge or the like to take advantage of the flow of water caused by aeration.

BRIEF DESCRIPTION OF DRAWINGS

FIG. 3 is a view with partial cutaway of the embodiment of FIG. 1 positioned in a pipe where water is flowing.

FIG. 4 is a side view of another embodiment of this invention used as a stationary device, as for example in an aquarium.

FIG. 4a is a bottom view of FIG. 4.

FIG. 5 is a side view of yet another embodiment of this invention adapted to spin with the flow of water in a pipe or the like.

FIG. 7 is a partial enlarged view of FIG. 6 with the cover shown but detached.

SPECIFIC EXAMPLES OF INVENTION

Example 1

Figure 1:
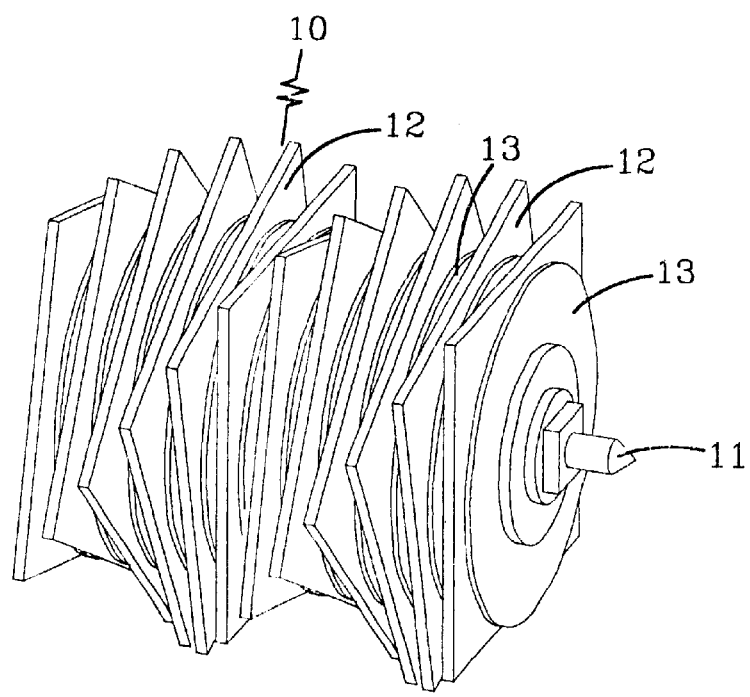
FIG. 1 is a left perspective view of one embodiment of this invention adapted to spin with the flow of water.
Figure 2:
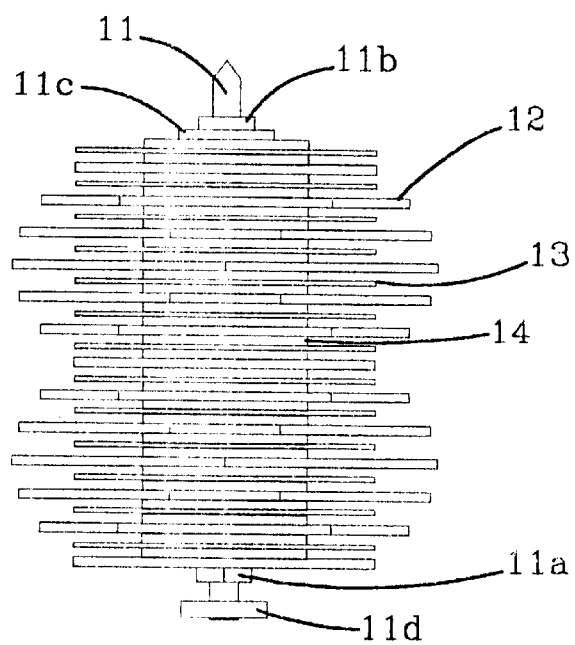
FIG. 2 is a side view of the embodiment of FIG. 1.

Referring now to the unit 10 illustrated in FIGS. 1–3, there is a central copper rod 11 of ⅜" thickness on which are mounted a plurality of rectangular magnesium plates 12, 6" by 6" squares, ¼" thick and circular copper plates 13, 1½" by 1/32" separated by magnesium spacers 14, approximately 1" by ¼", housed within water pipe 15. The unit has end plates 16 and 17. The magnesium plates 12 are preferably identical in size and shape, twisted so as to overlap providing more contact with the flowing water. The copper plates 13 are also preferably identical in size and shape. Rod 11 rotates on a bearing 11d held by a nut 11a. The plates are locked by a nut 11b and washer 11c. The unit 10 spins in the flow of water in pipe 15 so that the magnesium reacts with pollutants to precipitate them so as to be removable by filtration.

Example 2

The stationary unit illustrated in FIGS. 4 and 4a can be mounted in an aquarium or in a water pipe where the flow of water passes through the unit. The unit has a copper sleeve 44 with flanged ends which secure perforated magnesium disks 41, perforated copper disks 43, and perforated magnesium spacers 42. The unit is expendable and is sleeved over threaded support rod 45 and held in place by stop nut 47. The support rod 45 is mounted on an end plate 46 having perforations 48.

Example 3

Figure 5:
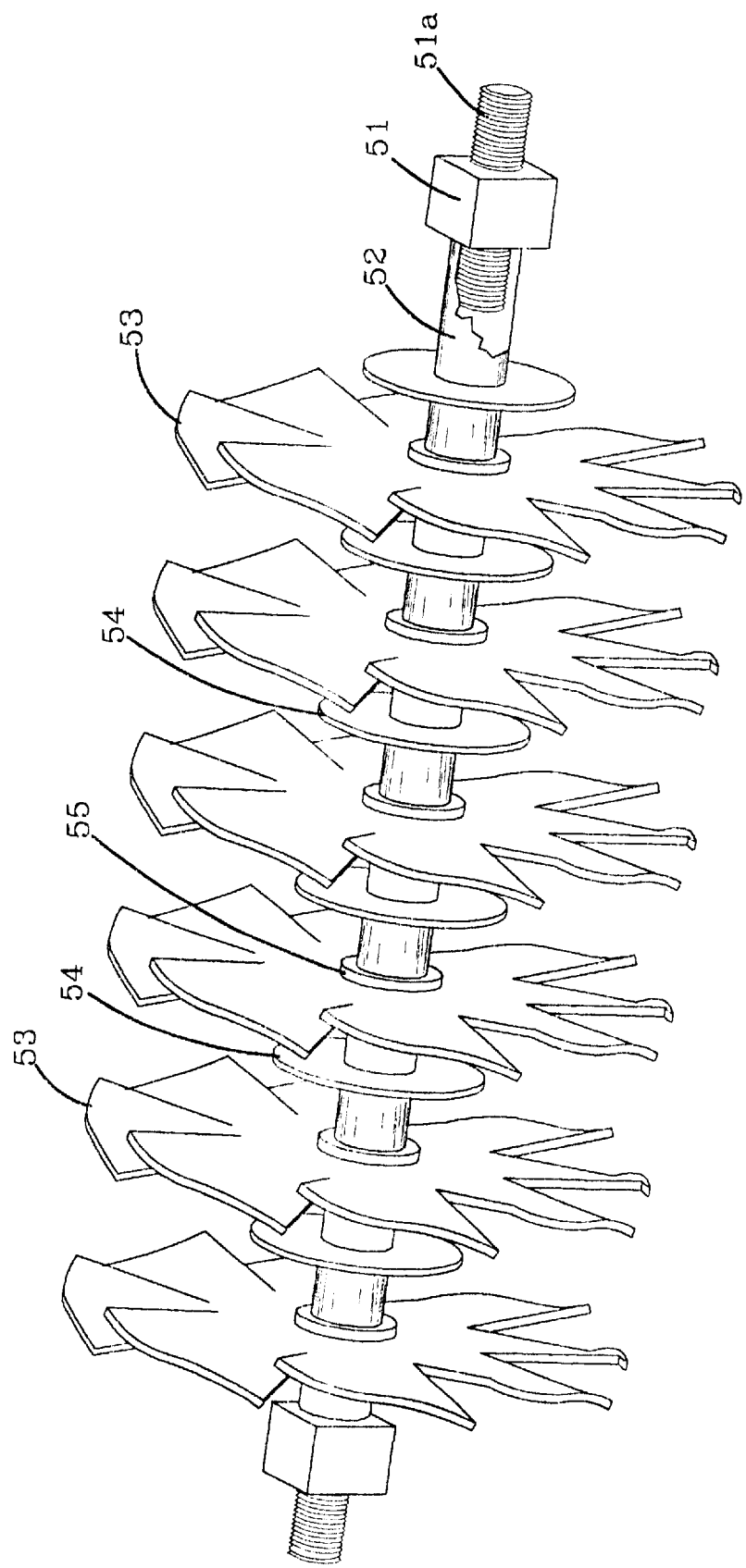

The unit illustrated in FIG. 5 can also be used in a water pipe having a flow of water. The unit comprises a threaded support rod 51a on which is mounted a copper sleeve 52. Mounted on sleeve 52 are spaced copper disks 54 and fluted magnesium disks 53. Mounted on either side of the fluted magnesium disks 53 are small copper disks 55. The unit is secured by nuts 51 on either end of the threaded rod.

Example 4

Figure 6:
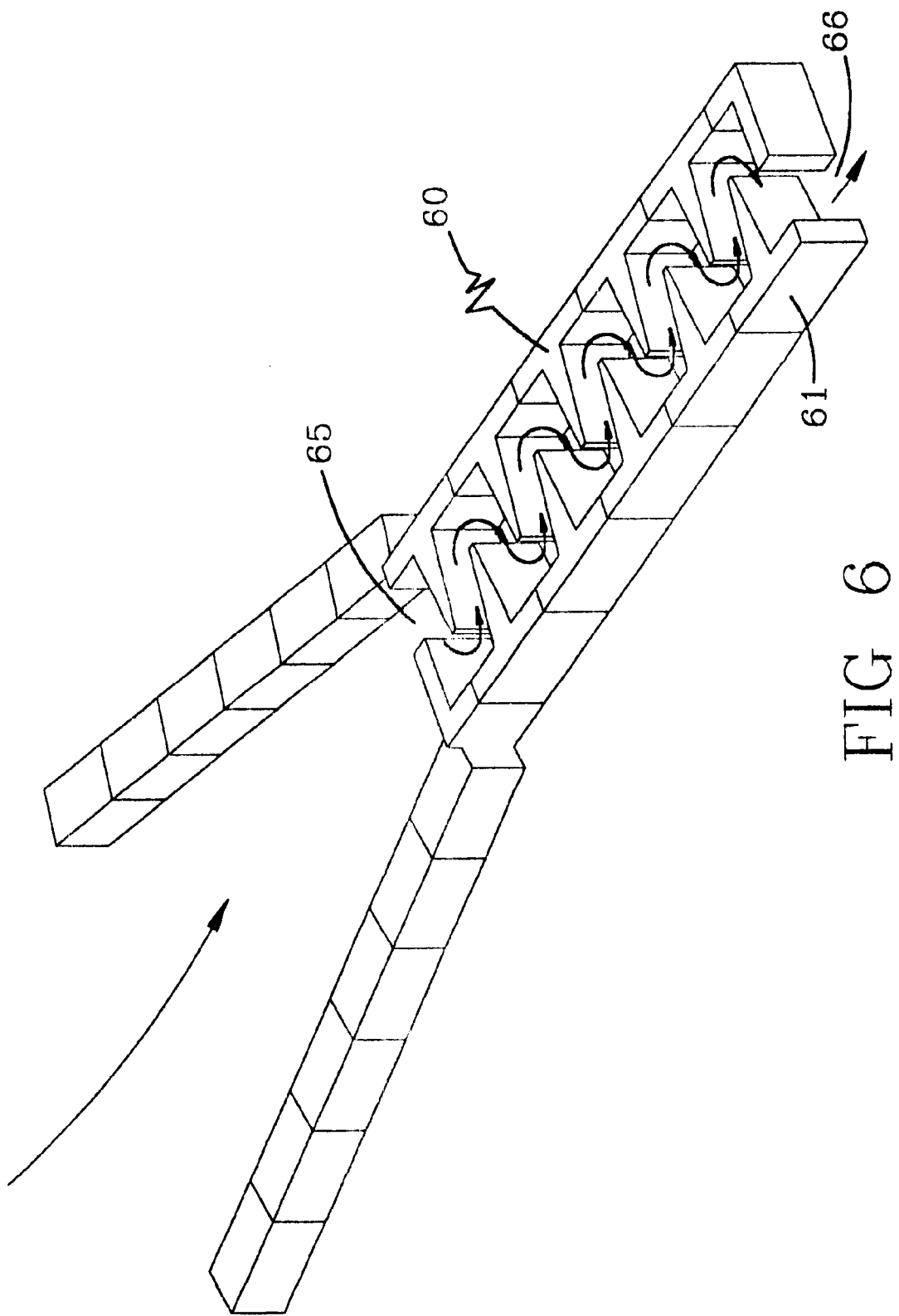
FIG. 6 is a view (uncovered) of a pathway in which a large flowing stream flows through units depending from the cover.

As illustrated in FIGS. 6 and 7, a concrete passageway 60 is shown having inward wall protrusions 61 on each side wall forming a tortuous path 65–66 for the flowing water from a large stream. On top of the passageway is a cover 62 from which depend a plurality of pollution removal units made in accordance with this invention. Each unit 63 comprises a copper rod 63b approximately ⅜ inches in diameter and 4 inches in length connected to other units 63 by wire 64. The rod is supported on the cover 62 by plastic washer 62c and is covered by a cap. The rod extends through the cover and supports a solid cylinder of magnesium 63a which is about 2 inches in diameter and 16 inches in length. The copper rod extends about 2 inches into the magnesium cylinder.

What is claimed is:

1. An assembly spaced vertically inside an aerated aquarium; comprising a support rod (45) having a copper outer surface (44) and carrying a perforated magnesium disk (41) and a perforated copper disk (43) separated from one another by a perforated magnesium spacer (42).

* * * * *